United States Patent
Fleming et al.

(10) Patent No.: US 7,404,995 B2
(45) Date of Patent: Jul. 29, 2008

(54) CONTAMINATION-CONTROL MAT ASSEMBLY WITH ADHESIVE-COATED SHEETS AND COMPOSITE POLYSTYRENE FRAME MEMBER AND ANTI-SLIP BACKING MEMBER, AND A PROCESS FOR FABRICATING THE SAME

(75) Inventors: Timothy J. Fleming, Greenville, OH (US); Richard R. Schulze, Stockbridge, GA (US)

(73) Assignee: Illinois Tool Works Inc., Glenview, IL (US)

( * ) Notice: Subject to any disclaimer, the term of this patent is extended or adjusted under 35 U.S.C. 154(b) by 161 days.

(21) Appl. No.: 11/035,724

(22) Filed: Jan. 18, 2005

(65) Prior Publication Data

US 2006/0159881 A1     Jul. 20, 2006

(51) Int. Cl.
*B32B 9/00* (2006.01)
*B32B 7/12* (2006.01)
*A47L 1/06* (2006.01)

(52) U.S. Cl. ............... 428/40.1; 428/41.3; 428/41.5; 428/42.3; 428/343; 428/354; 428/355 BL; 15/215; 15/216

(58) Field of Classification Search ............... 428/40.1, 428/41.3, 41.5, 42.3, 343, 354, 355 BL; 15/215, 15/216
See application file for complete search history.

(56) References Cited

U.S. PATENT DOCUMENTS

| 3,083,393 | A | 4/1963 | Nappi |
| 3,400,421 | A | 9/1968 | Nappi et al. |
| 3,501,797 | A | 3/1970 | Nappi |
| 3,717,897 | A | 2/1973 | Amos et al. |
| 3,785,102 | A | 1/1974 | Amos |
| 4,559,250 | A | 12/1985 | Paige |
| 6,093,469 | A | 7/2000 | Callas et al. |
| 2004/0261209 | A1 | 12/2004 | McKay |

FOREIGN PATENT DOCUMENTS

| FR | 2324451 | 4/1977 |
| GB | 1340636 | 12/1973 |
| WO | WO 0021751 | 4/2000 |

*Primary Examiner*—Victor S Chang
(74) *Attorney, Agent, or Firm*—Law Offices of Steven W. Weinrieb

(57) ABSTRACT

A new and improved contamination-control mat assembly which has a plurality of adhesive-coated sheets disposed upon the upper surface portion of the contamination-control mat assembly, and a new and improved polystyrene frame member, having an acrylic-rubber anti-slip backing member applied thereto, disposed upon the undersurface portion of the contamination-control mat assembly, wherein the polystyrene frame member and the acrylic-rubber anti-slip backing member are integrally affixed together by means of a coextrusion process.

2 Claims, 3 Drawing Sheets

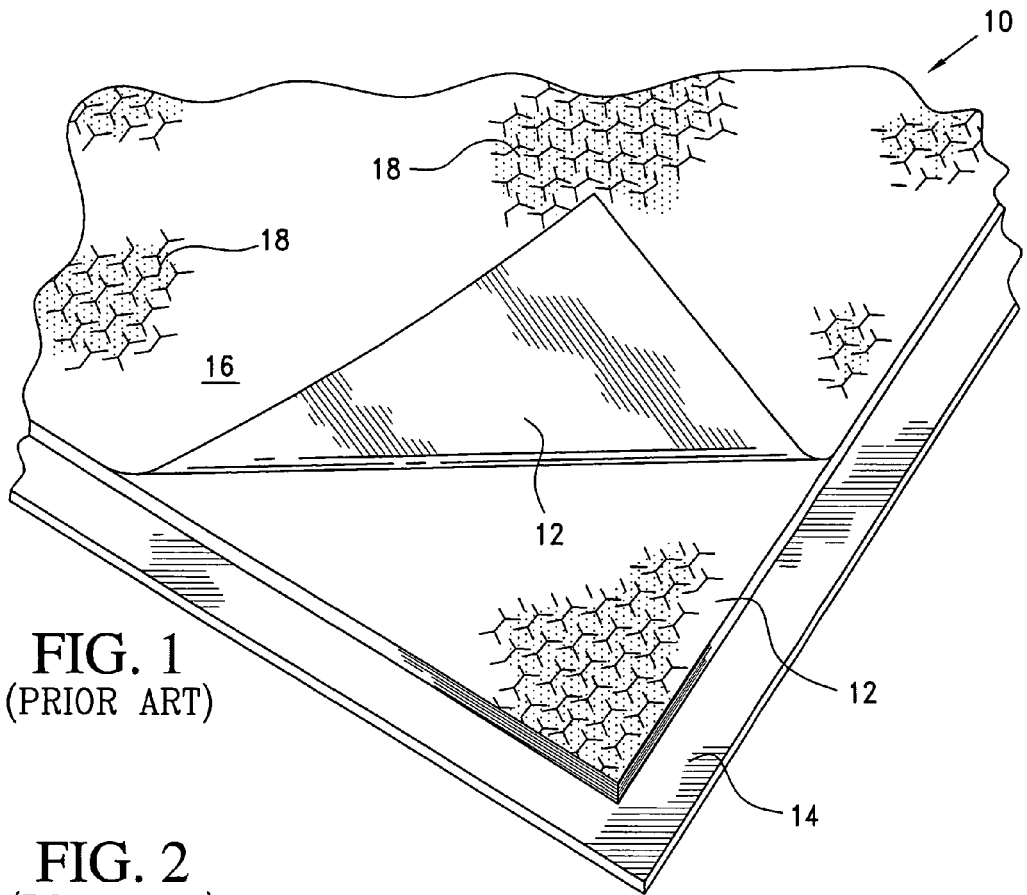
FIG. 1
(PRIOR ART)
FIG. 2
(PRIOR ART)
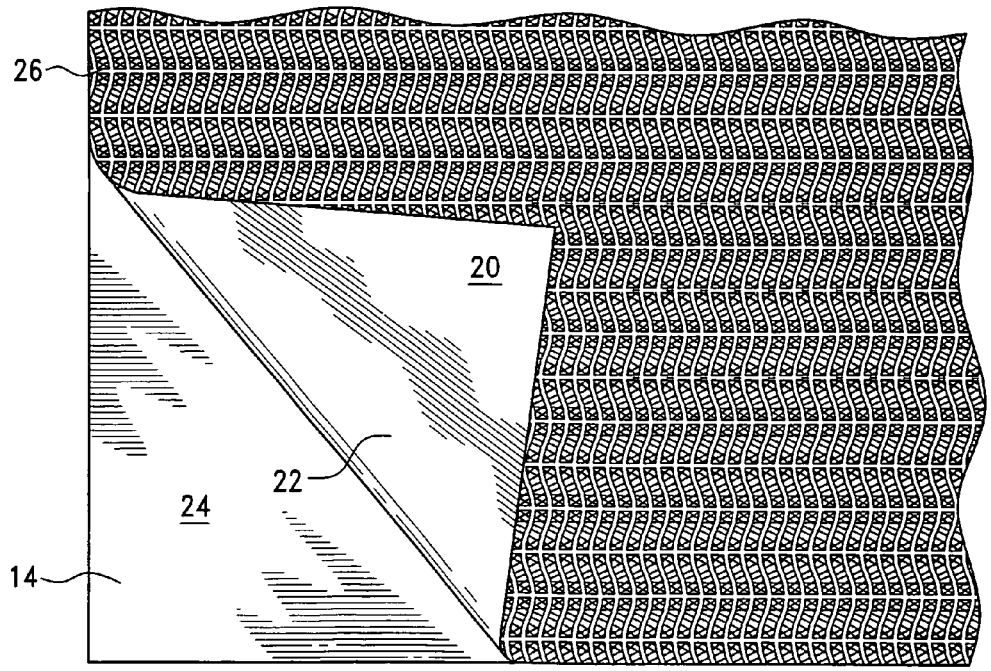

CONTAMINATION-CONTROL MAT ASSEMBLY WITH ADHESIVE-COATED SHEETS AND COMPOSITE POLYSTYRENE FRAME MEMBER AND ANTI-SLIP BACKING MEMBER, AND A PROCESS FOR FABRICATING THE SAME

FIELD OF THE INVENTION

The present invention relates generally to contamination-control mat assemblies, and more particularly to a new and improved contamination-control mat assembly which comprises a frame or substrate member, fabricated from polystyrene, a plurality of adhesive-coated sheets disposed upon the upper surface portion of the substrate or frame member, and an acrylic-rubber anti-slip backing member formed upon the undersurface portion of the substrate or frame member by means of a coextrusion process so as to form a composite polystyrene substrate or frame member and acrylic-rubber anti-slip backing member assembly.

BACKGROUND OF THE INVENTION

Adhesive-coated, contamination-control mats, commonly known or referred to as tacky mats, are well-known devices or implements which have been conventionally used to remove dirt, dust, and other contaminants from the soles of shoes, from the wheels of gurneys, carts, or other transportable apparatus, or from other objects, prior to the entrance of such objects or devices into "clean room" facilities in order to in fact maintain such "clean room" facilities in their desirably clean condition. Such "clean room" facilities may comprise, for example, hospital operating rooms, emergency rooms, critical patient care areas, or the like, or alternatively, laboratory or similar facilities within which microcircuitry and other delicate or sophisticated instrumentation is manufactured or assembled. Examples of such adhesive-coated contamination-control or tacky mats are disclosed within U.S. Pat. No. 4,559,250 which issued to Paige on Dec. 17, 1985, U.S. Pat. No. 3,785,102 which issued to Amos on Jan. 15, 1974, U.S. Pat. No. 3,717,897 which issued to Amos et al. on Feb. 27, 1973, U.S. Pat. No. 3,501,797 which issued to Nappi on Mar. 24, 1970, U.S. Pat. No. 3,400,421 which issued to Nappi et al. on Sep. 10, 1968, U.S. Pat. No. 3,083,393 which issued to Nappi on Apr. 2, 1963, and United Kingdom Patent Specification 1,340,636 which was published on Dec. 12, 1973 in the name of Nappi.

Conventional or PRIOR ART adhesive-coated, contamination-control mats have conventionally comprised two basic constructions. The first embodiment or type of adhesive-coated, contamination-control mat essentially comprises a relatively thick, single member or single layer mat fabricated, for example, from polyvinyl chloride (PVC), whereas the second embodiment or type of adhesive-coated, contamination-control mat essentially comprises a multi-layer laminated stack of adhesive-coated plastic film sheets. More particularly, as a result of the fabrication of the first embodiment or type of adhesive-coated, contamination-control mat as a relatively thick, single member or single layer mat, the weight and inertial mass of the mat enables the same to be simply disposed upon the underlying floor support structure without the need for adhesively bonding, for example, the undersurface portion of the mat to the underlying floor support structure. In addition, while the upper surface portion of the single member or single layer adhesive-coated, contamination-control mat is characterized by means of an adhesive layer which exhibits a relatively low-level of adhesiveness or tackiness so as to effectively remove dirt or dust either from the shoes of facility personnel, or from the wheels of gurneys, carts, or other transportable apparatus, while obviously not impeding the traversal of the same by facility personnel, or the movement thereacross of the transportable apparatus, it has been noted that when the upper surface portion of the single member or single layer adhesive-coated, contamination-control mat becomes soiled as a result of the accumulation of dirt and dust thereon, its effectiveness rapidly deteriorates.

Accordingly, such upper surface portion of the single member or single layer adhesive-coated, contamination-control mat must then be subjected to a water washing process or procedure, and appropriately dried so as to once again be capable of being used for its intended purposes. In addition to such cleaning process or procedure being time-consuming, the upper, adhesive-coated surface portion of the single member or single layer adhesive-coated, contamination-control mat tends to become eroded or worn as a result of being subjected to the repetitive cleaning processes or procedures. Still further, it is noted that the single member or single layer adhesive-coated, contamination control mat must either be replaced with another single member or single layer adhesive-coated, contamination-control mat, while the original single member or single layer adhesive-coated, contamination control mat undergoes its refurbishing or cleaning process or procedure, so as to permit the "clean-room" facility to be used continuously, or else the "clean-room" facility must be temporarily closed until the original single member or single layer adhesive-coated, contamination-control mat can again be used. Still further, since this particular adhesive-coated, contamination-control mat is characterized by means of a single member or single layer structure which has a relatively large thickness dimension, this embodiment or type of contamination-control mat often presents a trip hazard to facility personnel, or an obstacle over which the transportable apparatus must be forcefully moved. This embodiment or type of contamination-control mat has therefore not proven to be particularly desirable or viable.

The second embodiment or type of adhesive-coated, contamination-control mat assembly is disclosed within FIGS. 1 and 2, is generally indicated by the reference character 10, and is seen to comprise a multi-layer, laminated stack of adhesive-coated plastic film sheets 12, such as, for example, approximately thirty or sixty adhesive-coated plastic film sheets, which are disposed upon an underlying frame or substrate member 14. The adhesive-coated surface 16 of each one of the plastic film sheets 12 faces upwardly, and accordingly, when the external, upwardly disposed surface of the upper-most one of the plurality of adhesive-coated plastic film sheets 12 becomes soiled, such as, for example, when dirt and dust, as exemplified by means of the footprints 18, accumulate thereon to such a degree that the dirt and dust removal properties of such uppermost one of the plurality of adhesive-coated plastic film sheets 12 is no longer adequately effective, then such uppermost one of the plurality of adhesive-coated plastic film sheets 12 is simply removed from the laminated stack of adhesive-coated plastic film sheets so as to effectively uncover the next one of the plurality of adhesive-coated plastic film sheets 12 which is obviously clean and therefore ready for immediate use. Since this embodiment or type of adhesive-coated, contamination-control mat assembly 10 obviously does not require any washing or cleaning, the operational drawbacks or disadvantages, characteristic of the first embodiment or type of adhesive-coated, contamination-control mat, are effectively overcome or eliminated.

It is noted, however, that, in view of the fact that the uppermost ones of the adhesive-coated plastic film sheets 12 are being continually removed from the laminated stack of adhesive-coated plastic film sheets, when it is so required in order to maintain the adhesive properties of the adhesive-coated, contamination-control mat assembly 10 effective, the entire contamination-control mat assembly 10 need not be normally removed from the underlying floor support structure for cleaning and washing purposes, and therefore, it is desired to maintain the contamination-control mat assembly 10 at a fixed position with respect to the entrance-way into the "clean room" facility, other than when the supply of the adhesive-coated plastic film sheets 12 is exhausted, thereby necessitating the replacement of the entire contamination-control mat assembly 10 with a new contamination-control mat assembly. Therefore, suitable means must be provided upon the undersurface portion of the contamination-control mat assembly 10 so as to in fact maintain the contamination-control mat assembly 10 at its designated position with respect to the entrance-way into the "clean room" facility. Accordingly, one means for ensuring the fact that the disposition of the contamination-control mat assembly 10 is in fact properly maintained upon the underlying floor support structure at the entranceway to the "clean room" facility resides in providing the undersurface portion of the substrate or frame member 14 of the contamination-control mat assembly 10 with suitable backing structure which has anti-slip properties.

More particularly, as may best be appreciated from FIG. 2, the substrate or frame member 14, which may be fabricated from a suitable polystyrene material, has an upper surface portion 20 of an anchor film 22, which may be fabricated from polyethylene, adhesively bonded to the undersurface portion 24 of the substrate or frame member 14 while a rubberized rug-lock fabric material 26 is suitably adhesively bonded to the undersurface portion of the anchor film 22. While this contamination-control mat assembly 10 is obviously satisfactory from an operational point of view in that the same adequately achieves its objectives of removing dirt, dust, and other contaminants from the soles of shoes, from the wheels of gurneys, carts, or other transportable apparatus, or from other objects, prior to the entrance of such objects or devices into "clean room" facilities in order to in fact maintain such "clean room" facilities in their desirably clean condition, the multiple-step fabrication process comprising, for example, the extrusion of the polystyrene substrate or frame member 14, the application of the anchor film 22 to the undersurface portion 24 of the polystyrene substrate or frame member 14, and the application of the rubberized rug-lock fabric material 26 to the undersurface portion of the anchor film 22 is time-consuming and costly to implement. In addition, there is the possibility that the anchor film 22 can partially or completely detach from the undersurface portion 24 of the polystyrene substrate or frame member 14, or alternatively, that the rubberized rug-lock fabric material 26 can partially or completely detach from the anchor film 22, either one of such scenarios presenting a hazardous condition within the particular environment.

A need therefore exists in the art for a new and improved contamination-control mat assembly which comprises a plurality of adhesive-coated sheets disposed upon a substrate or frame member, and wherein an anti-slip backing member is fabricated with the substrate or frame member by means of a one-step process such that the substrate and anti-slip backing member are integrally affixed together so as to form a composite polystyrene substrate or frame member and acrylic-rubber anti-slip backing member assembly.

SUMMARY OF THE INVENTION

The foregoing and other objectives are achieved in accordance with the teachings and principles of the present invention through the provision of a new and improved contamination-control mat assembly which comprises a frame or substrate member, fabricated from polystyrene, a plurality of adhesive-coated sheets disposed upon the upper surface portion of the substrate or frame member, and an acrylic-rubber anti-slip backing member formed upon the undersurface portion of the substrate or frame member by means of a coextrusion process so as to form a composite polystyrene substrate or frame member and acrylic-rubber anti-slip backing member assembly.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 1 is a top perspective view of a conventional, PRIOR ART contamination-control mat assembly showing a plurality of adhesive-coated plastic film sheets secured to an underlying substrate or frame member;

FIG. 2 is a bottom plan view of the conventional, PRIOR ART contamination-control mat assembly disclosed within FIG. 1 showing the underlying substrate or frame member upon which there is adhesively bonded a rubberized rug-lock fabric material, by means of an anchor film, so as to provide the contamination-control mat assembly with ant-slip properties;

DETAILED DESCRIPTION OF THE PREFERRED EMBODIMENT

Figure 3:
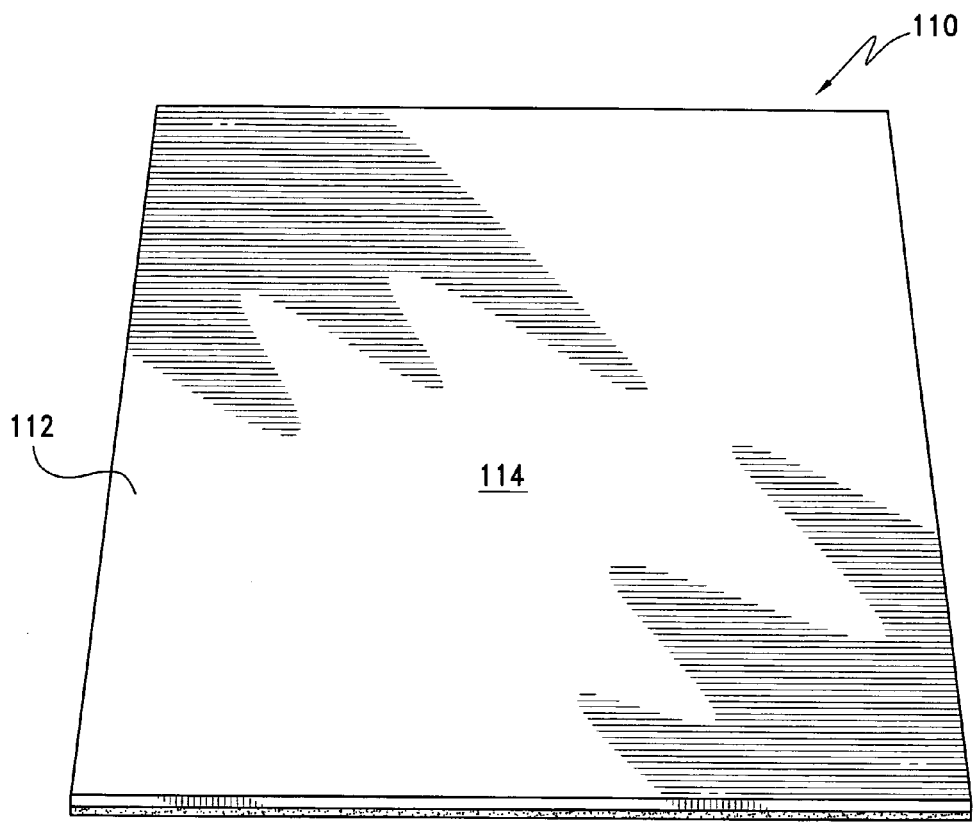
FIG. 3 is a top perspective view of a new and improved composite substrate or frame member and acrylic-rubber anti-slip backing member assembly which has been constructed in accordance with the principles and teachings of the present invention and which comprises a polystyrene substrate or frame member to the undersurface of which is integrally affixed an acrylic-rubber anti-slip backing member by means of a coextrusion process, wherein the new and improved composite polystyrene substrate or frame member and acrylic-rubber anti-slip backing member assembly can have a plurality of adhesive-coated plastic film sheets secured to the upper surface portion thereof so as to form therewith a new and improved contamination-control mat assembly.
Figure 4:
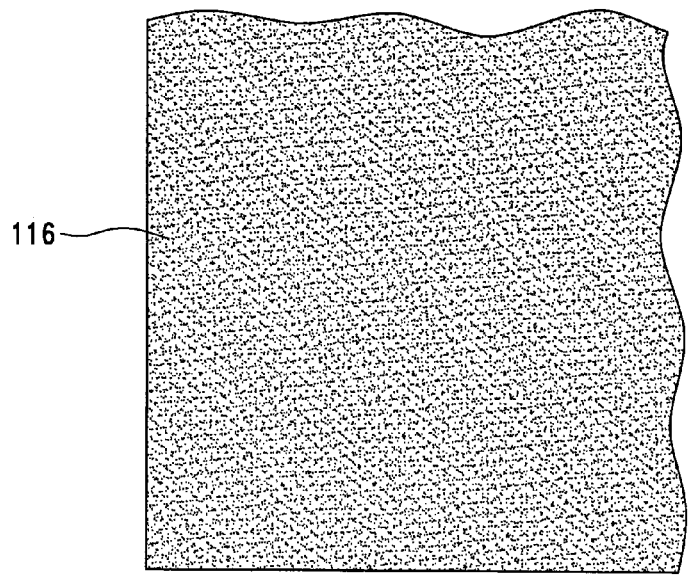
FIG. 4 is an enlarged, close-up, bottom plan view of the acrylic-rubber anti-slip backing member as coextruded upon the polystyrene substrate or frame member disclosed in FIG. 3 in order to fabricate the composite polystyrene substrate or frame member and acrylic-rubber anti-slip backing member assembly.

Referring again to the drawings, and in particular to FIGS. 3 and 4 thereof, a new and improved composite polystyrene substrate or frame member and acrylic-rubber anti-slip backing member assembly, constructed in accordance with the principles and teachings of the present invention, is disclosed and is generally indicated by the reference character 110.

More particularly, the composite polystyrene substrate or frame member and acrylic-rubber anti-slip backing member assembly 110 is seen to comprise a polystyrene substrate or frame member 112, which effectively serves the same purpose as the substrate or frame member 14 as disclosed in FIG. 1 in that a plurality of adhesive-coated plastic film sheets, similar to the adhesive-coated plastic film sheets 12, also as disclosed within FIG. 1, may be supported upon the upper surface portion 114 of the polystyrene substrate or frame member 112, and an acrylic-rubber anti-slip backing member 116 which is integrally formed upon the undersurface portion of the polystyrene substrate or frame member 112 by means of a coextrusion process which will be disclosed and described shortly hereinafter. As a result of the fabrication of the composite polystyrene substrate or frame member and acrylic-rubber anti-slip backing member assembly 110 by means of the aforenoted coextrusion process, it is to be appreciated that not only will the fabrication of the composite polystyrene substrate or frame member and acrylic-rubber anti-slip backing member assembly 110 be expedited and rendered more cost effective than the multi-step fabrication process characteristic of the conventional contamination-control mat assembly 10 as disclosed within FIGS. 1 and 2, but in addition, there is no danger of the acrylic-rubber anti-slip backing member 116 becoming separated from the undersurface portion of the polystyrene substrate or frame member 112 as is characteristic of the anchor film 22, of the conventional contamination-control mat assembly 10, with respect to the undersurface portion 24 of the polystyrene substrate or frame member 14, or as is characteristic of the rubberized rug-lock fabric material 26 with respect to the anchor film 22.

Figure 5:
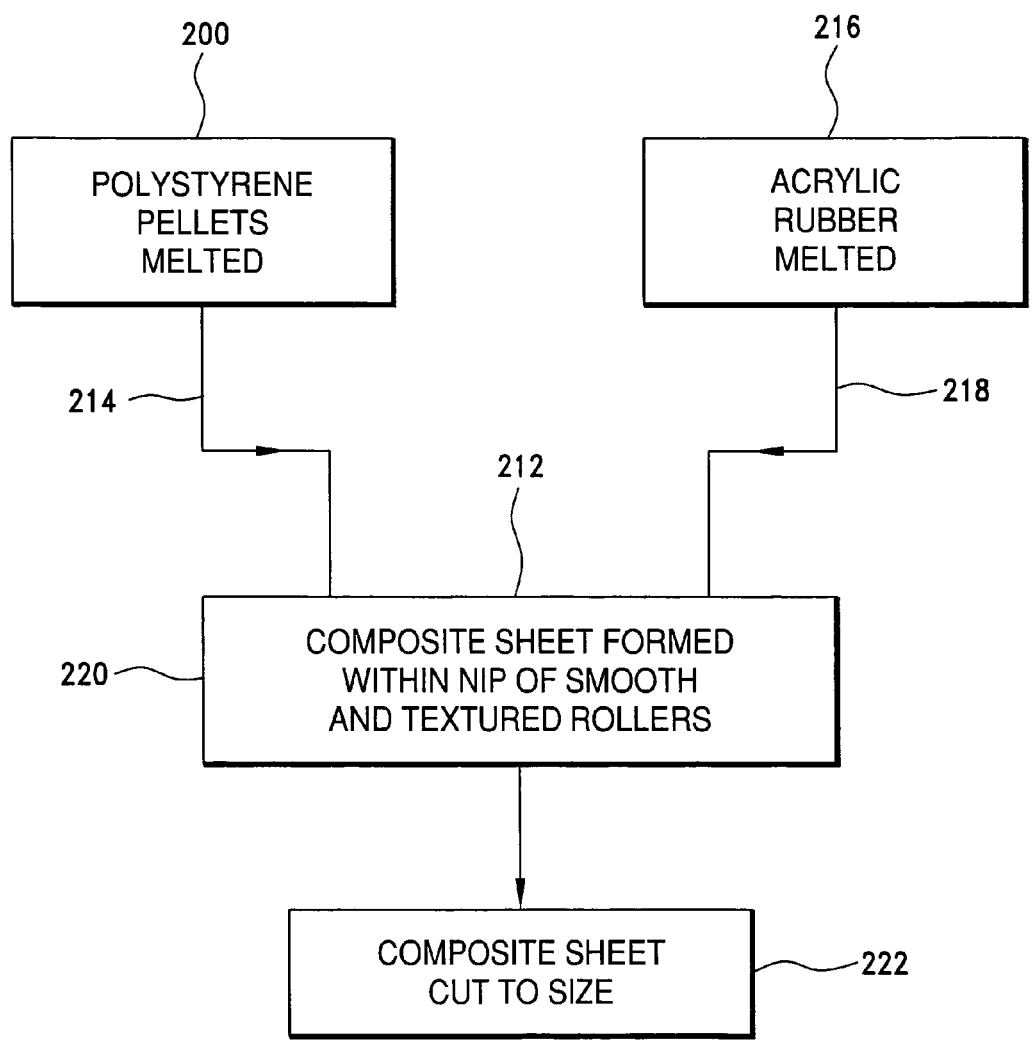
FIG. 5 is a schematic flow chart illustrating the various steps of the coextrusion process, developed in accordance with the principles and teachings of the present invention, by means of which the polystyrene substrate or frame member and the acrylic-rubber anti-slip backing member are integrally fabricated together so as to form the composite polystyrene substrate or frame member and acrylic-rubber anti-slip backing member assembly.

With reference now being lastly made to FIG. 5, there is shown a flow chart of the coextrusion process by means of which the composite polystyrene substrate or frame member and acrylic-rubber anti-slip backing member assembly 110 can be fabricated. More particularly, it is seen that polystyrene pellets are initially melted at a predetreminedly high temperature level, such as, for example, 380° F., as schematically indicated at 200, and the polystyrene is then conducted or transferred in liquid form to an extruder mechanism or apparatus 212 along a first processing line 214. In a similar manner, a suitable acrylic-rubber blend, such as, for example, acrylic styrene butadiene, is initially melted at a predeterminedly high temperature level, such as, for example, 380° F., as schematically indicated at 216, and the acrylic-rubber blend is likewise conducted or transferred in liquid form to the extruder mechanism or apparatus 212 along a second processing line 218. Within the extruder mechanism or apparatus 212, there is disposed a pair of compression rollers, a first upper one of the pair of compression rollers having a relatively smooth outer peripheral surface, while the second lower one of the pair of compression rollers has a textured outer peripheral surface. The liquid polystyrene and acrylic-rubber blend materials are effectively conducted into the nip defined between the aforenoted pair of compression rollers whereby the liquid polystyrene and acrylic-rubber blend materials are effectively formed or pressed into a continuous, laminated, composite sheet, as schematically illustrated at 220, with the polystyrene material forming the top portion of the continuous, laminated, composite sheet, while the acrylic-rubber material forms the bottom portion of the continuous, laminated, composite sheet, the textured outer peripheral surface portion of the lower one of the pair of rollers thereby forming a predetermined non-slip pattern within the undersurface portion of the acrylic-rubber material such that the same can effectively comprise the acrylic-rubber backing member 116 as illustrated within FIG. 4. Subsequently, the continuous, laminated, composite sheet will be cut to a predetermined size, as schematically illustrated at 222, so as to form the composite polystyrene substrate or frame member and acrylic-rubber anti-slip backing member assembly 110.

It is lastly noted, in connection with the fabrication of each one of the adhesive-coated plastic film sheets 12 comprising the stacked array of adhesive-coated plastic film sheets as disclosed within FIG. 1, and which may likewise be disposed atop the polystyrene substrate or frame member 112 of the composite polystyrene substrate or frame member and acrylic-rubber anti-slip backing member assembly 110, wherein each one of the adhesive-coated plastic film sheets 12 comprises an adhesive-coated surface upon which "clean-room" personnel walk or tread prior to entering the "clean-room" facility, or upon or over which apparatus, such as, for ex-ample, wheeled carts or the like, are moved, such that dirt and debris disposed upon the wheels of such apparatus, or dirt or debris disposed upon the shoes of the "clean-room" personnel, can be removed, that the structure or make-up of the multi-layered stack or laminate of adhesive-coated plastic film sheets, and that of each one of the multitude of individual sheets 12, may be derived from or similar to the tack mat stack and individual sheets as disclosed, for example, within U.S. Pat. No. 4,559,250 which issued to Paige on Dec. 17, 1985. More particularly, each one of the individual sheets 12, comprising the multi-layered stack or laminate of adhesive-coated sheets, may be fabricated, for example, from high-density polyethylene (HDPE), linear low-density polyethylene (LLDPE), or non-linear low-density polyethylene (LDPE).

High-density polyethylene (HDPE) film typically has a film tensile strength of 4800 psi, ASTM test method D882, which is sufficient to withstand an adhesive pull load from an underlying film layer of ten ounces per lineal inch of width, while linear low-density polyethylene (LLDPE) film typically has a film tensile strength of 6000 psi which, again, is sufficient to withstand ten ounces of adhesion per inch of width without tearing, and non-linear low-density polyethylene (LDPE) film typically has a film tensile strength of 2800 psi. Each one of the sheets 12, comprising the multi-layered stack or laminate of adhesive-coated sheets, can have a thickness dimension which is within the range of 0.4 mil to 2.5 mils, and a thickness dimension of 1.0 mil is preferred. It is noted that if a film, having a thickness dimension of less than 1.0 mil, is to be used, the adhesive pull load must be accordingly reduced. For example, if a film having a thickness dimension of 0.4 mil is to be used, the adhesive pull load must be within the range of five ounces or less. It is also to be noted that it is more economical to use a relatively thin film in that plastic films are normally priced as a function of weight, such as, for example, per pound. Since a 1.0 mil film effectively yields three times the amount of working-surface area of film per pound as that of a 3.0 mil film, then a sheet of film, having a predetermined surface area, would be three times more expensive when produce as a film having a thickness dimension of 3.0 mils than a similar sheet of film having a thickness dimension of 1.0 mil.

In order to ensure that the exposed adhesive material will strongly adhere to the external surface of the polyethylene film so as to serve its intended dirt or debris removal functions, it is necessary to effectively distress the ordinarily smooth surface of the film. This distressing treatment of the film surface is accomplished by subjecting the film surface to a high electronic discharge which is commonly known as corona treatment. If the film surface is not in fact subjected to such corona treatment, the adhesive material would tend to rub off from the plastic film or to undesirably adhere and be transferred to the object which comes into contact or engagement with such adhesive material. Still further, while it is important to facilitate the separation of the individual sheets 12, comprising the multi-layered stack or laminate of adhesive-coated sheets, from each other when desired such that, for example, an old or used sheet 12 of the contamination-control mat assembly 10 can be removed from the underlying multi-layered stack or laminate of adhesive-coated sheets whereby a new or fresh sheet 12 of the underlying multi-layered stack or laminate of adhesive-coated sheets of the contamination-control mat assembly 10 can be exposed, it is also important to prevent premature delamination or separation of the individual sheets 12 of the multi-layered stack or laminate of adhesive-coated plastic film sheets from each other so as not to adversely affect the continued use of the contamination-control mat assembly 10 by permitting the individual sheets 12 of the multi-layered stack or laminate of adhesive-coated sheets to be successively and individually exposed. Accordingly, the non-adhesive or uncoated side of each one of the sheets 12, comprising the multi-layered stack or laminate of adhesive-coated sheets, is likewise subjected to the aforenoted electronic or corona treatment, as a result of which, the non-adhesive or uncoated sides of the plastic sheets 12 adhere more strongly to the underlying adhesive-coated sides or surfaces of the plastic sheets 12 whereby the plastic sheets 12 of the contamination-control mat assembly 10 are held tightly together and are effectively prevented from undergoing or exhibiting premature delamination.

Continuing still further, it is to be noted that the electronic corona treatment process results in a treatment level which effectively produces a force, which can of course be measured in dynes, by means of which the adhesive material is coated and bound upon the plastic film. A ten-dyne treatment level, or a twenty-dyne treatment level, is less disruptive to a plastic film surface than a forty-dyne treatment level, and accordingly, adhesive material which is coated upon a plastic film surface by means of a forty-dyne treatment level will be bound more tightly to the electronic corona-treated surface of the film than adhesive material which is coated upon the plastic film surface by means of a ten or twenty-dyne treatment level. Accordingly, still further, it is to be further appreciated that when adhesive material is coated onto a plastic film surface by means of a predetermined dyne treatment level, and when such adhesive-coated film surface is laminated to a plastic film surface which has not been coated with adhesive material but which also been subjected to an electronic corona treatment process at the same predetermined dyne treatment level, the adhesive material will adhere just as tightly to the non-coated corona-treated plastic film surface as it will adhere to plastic film surface upon which it has been originally coated.

Therefore, it has been experienced that when both plastic film surfaces have been treated by means of, for example, forty-dyne treatment levels, the two film surfaces will not readily separate from each other whereby the films per se exhibiting tearing, or the adhesive material being partially delaminated from the film surface upon which it was originally coated. Conversely, when both plastic film surfaces have been treated by means of, for example, ten or twenty-dyne treatment levels, the two film surfaces are able to be readily separated from each other without the films per se exhibiting tearing, or without the adhesive material being partially delaminated from the film surface upon which it was originally coated. Therefore, according to the principles and teachings of the present invention, the plastic film sheets 12 can have adhesive material coated upon one side or surface thereof, the plastic film sheets 12 can effectively be adhered to each other, or held together, so as to form the multi-sheet or multi-layered stack or laminate of adhesive-coated sheets 12, and yet, the plastic film sheets 12 can be readily separated and released from each other as a result of properly controlling the electronic corona discharge treatment level.

In connection with the proper control of the electronic corona discharge treatment levels to be impressed upon both the adhesive-coated and non-coated sides or surfaces of the film sheets 12, it is noted further that the two sides or surfaces of each film sheet 12 need not be treated with the same dyne treatment level. For example, the non-coated side or surface of each film sheet 12 may be subjected to a dyne treatment level which is approximately one half that of the dyne treatment level to which the adhesive-coated side or surface of each film sheet 12 is subjected. This relative treatment level relationship, as defined between the non-coated and adhesive-coated sides or surfaces of each film sheet 12, thus provides the necessary adherence of the individual film sheets 12, of the multi-sheet or multi-layered stack or laminate of adhesive-coated sheets, to each other while nevertheless permitting the individual film sheets 12, of the multi-sheet or multi-layered stack or laminate of adhesive-coated sheets, to be separated or released from each other when desired. In accordance with such dyne treatment levels of both the non-coated and adhesive-coated sides or surfaces of the film sheets 12, it is also noted that the particular treatment level for a particular one of the sides or surfaces of the film sheets 12 may be varied, as may the relative pro-portion or ratio of the treatment levels for the opposite sides or surfaces of the film sheets 12, in order to in fact achieve the aforenoted optimum results. While optimum results may vary in connection with different plastic films, such as, for example, dependent upon the chemical composition of the plastic film per se, or the chemical composition of the particular adhesive and cross-linking materials, as well as the relative percentages by weight of the adhesive and cross-linking materials within the adhesive composition, being used upon the particular plastic film, it has been found that in order to achieve such optimum results for various plastic films, the adhesive-coated side or surface of each plastic film sheet 12 is preferably treated at an electronic corona discharge treatment level which is within the range of 40-50 dynes, while the non-coated side or surface of each plastic film sheet 12 is preferably treated at an electronic corona discharge treatment level which is within the range of 10-30 dynes.

Thus, it may be seen that in accordance with the principles and teachings of the present invention, there has been disclosed a new and improved contamination-control mat assembly which comprises a frame or substrate member, fabricated from polystyrene, a plurality of adhesive-coated sheets disposed upon the upper surface portion of the substrate or frame member, and an acrylic-rubber anti-slip backing member formed upon the undersurface portion of the substrate or frame member by means of a coextrusion process so as to form a composite polystyrene substrate or frame member and acrylic-rubber anti-slip backing member assembly.

Obviously, many variations and modifications of the present invention are possible in light of the above teachings. It is therefore to be understood that within the scope of the appended claims, the present invention may be practiced otherwise than as specifically described herein.

The invention claimed is:

1. A contamination-control mat assembly, to be disposed upon an underlying floor support structure, comprising:

a composite frame member and anti-slip backing member assembly; and a stacked array of adhesive-coated contamination-control sheets disposed upon an upper surface portion of said composite frame member and anti-slip backing member assembly;

said composite frame member and anti-slip backing member assembly comprising a polystyrene frame member having an upper surface portion upon which said stacked array of adhesive-coated contamination-control sheets are disposed, and an acrylic-rubber anti-slip backing member coextruded upon an undersurface portion of said polystyrene frame member so as to integrally form, with said polystyrene frame member, said composite frame member and anti-slip backing member assembly.

2. The contamination-control mat assembly as set forth in claim 1, wherein:

said acrylic-rubber anti-slip backing member comprises acrylic styrene-butadiene rubber.

* * * * *